Oct. 8, 1968  F. P. D'ESOPO  3,404,706
RACEWAY SYSTEM FOR ELECTRICAL WIRING
Filed Nov. 9, 1964  2 Sheets-Sheet 2
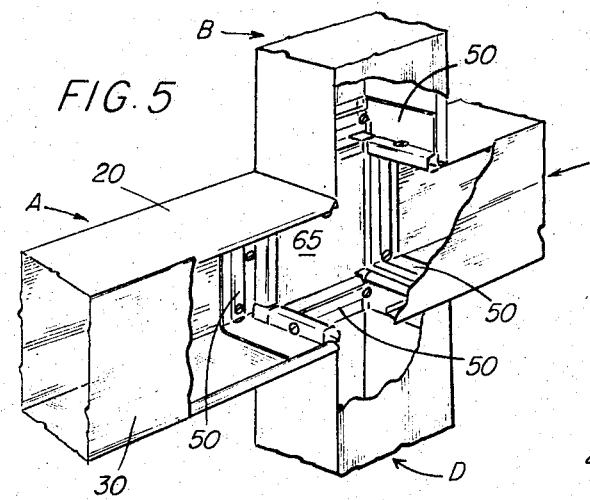
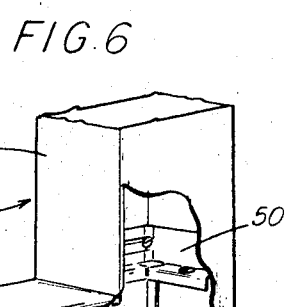
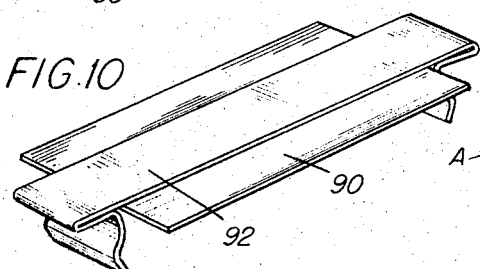
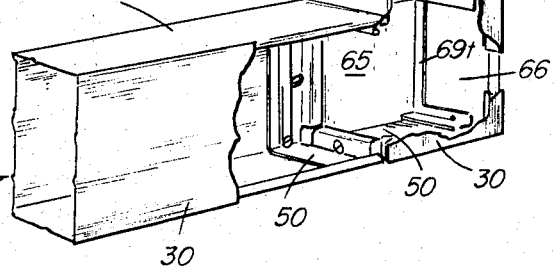
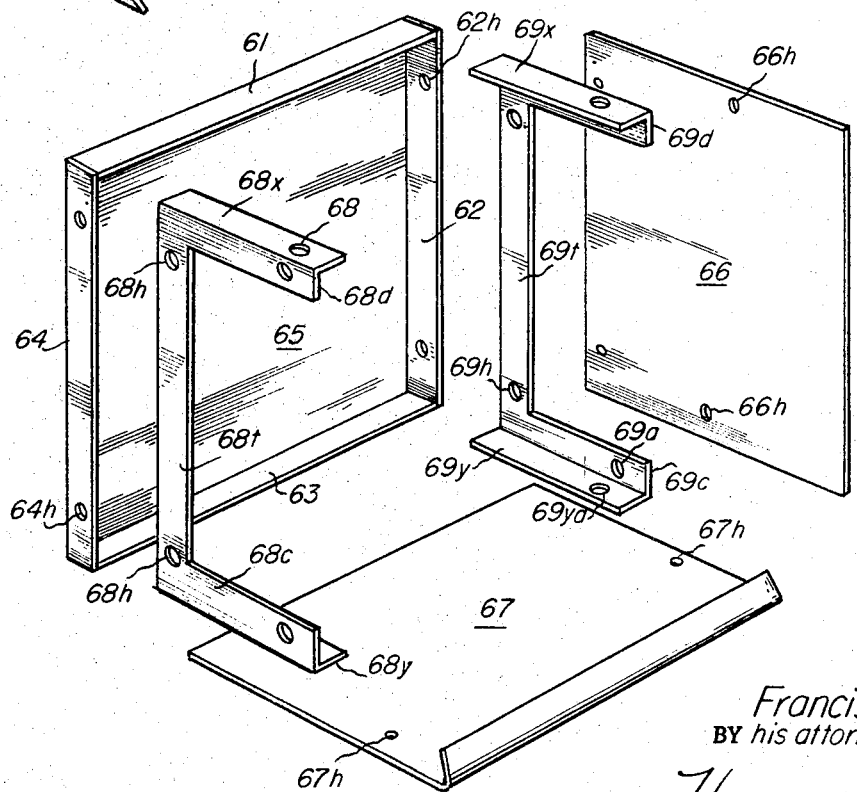
INVENTOR.
Francis P. D'Esopo
BY his attorneys
Howson and Howson.

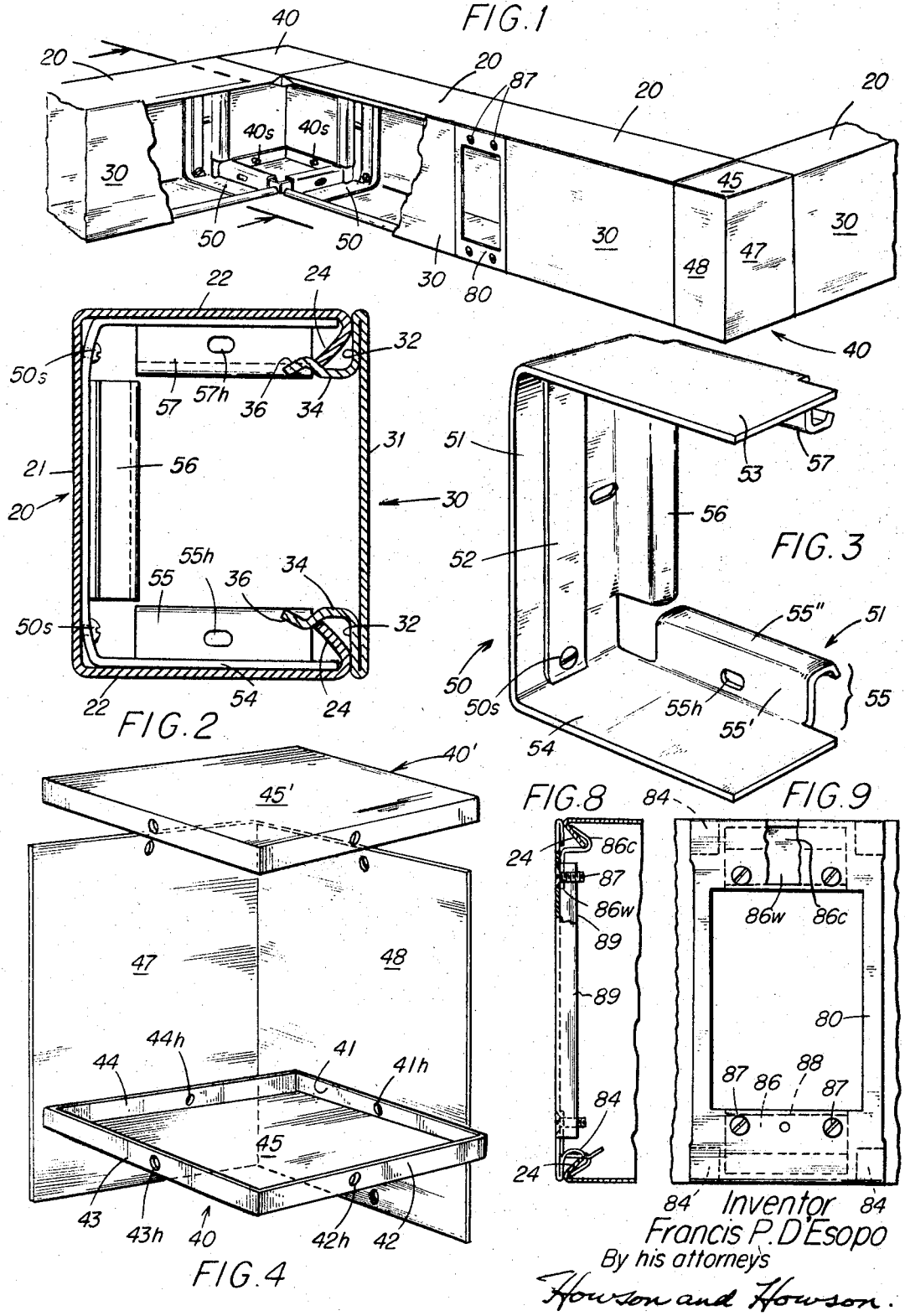

United States Patent Office 3,404,706
Patented Oct. 8, 1968

3,404,706
RACEWAY SYSTEM FOR ELECTRICAL WIRING
Francis P. D'Esopo, West Hartford, Conn., assignor to The Wiremold Company, West Hartford, Conn., a corporation of Connecticut
Filed Nov. 9, 1964, Ser. No. 409,651
21 Claims. (Cl. 138—163)

This invention relates to raceways for electric wires and wiring devices and, more particularly, to raceways having a base section onto which a cover section may be snapped. The invention also relates to fittings built for use in connection with the raceways.

Raceway systems designed for attachment to walls or other vertical surfaces, as heretofore devised, have been made in rather small sizes measuring usually about 2¾ inches or less across the duct portion. The present invention was conceived for larger size raceways approaching five inches, approximately, but is not limited to such size.

It is an object of this invention to provide a novel electrical raceway construction of the snap-on cover type which is particularly adapted for large size raceways for use where a concentration of wiring devices is required with ample room for a variety of services and in which commercially available wiring devices may be easily installed.

Another object is to provide a raceway system which is readily adaptable to addition and changes in electrical services.

Another object is to provide a raceway system which provides effective shielding, particularly at joints, for laboratory installations where various voltages and frequencies are used.

Another object is to provide a fitting for use with a raceway of the above type which, by mere reversal of position, can be used either as an external or internal elbow connection to join adjacent raceway sections, thus to avoid the need to produce and stock separate parts for internal and external elbows.

Another object is to provide a flat elbow construction for use with raceways of the above type for making connections between adjacent raceways on flat surfaces, which elbow has a skeleton structure permitting the addition or subtraction of side plates and converter couplings in order to adapt the fitting for use as an elbow or for use as a T or cross connection.

Another object is to provide a converter coupling for use with connector fittings, which is easily connectable to raceway sections and provides complete shielding in cases where various voltages and frequencies are present in the vicinity of the raceway.

Another object is to provide one form of converter coupling for use in a raceway system as above which enables either internal or external connections to be made with an elbow fitting when the coupling is used with the fitting and which also enables flat elbows, T or cross connections to be made when two or more couplings are used with the skeleton of a flat elbow fitting.

Other objects and advantages of the invention will become apparent as it is described in connection with the accompanying drawings.

In the drawings:

FIG. 1 is a perspective view, partly broken away, of a raceway embodying the invention showing internal and external elbow fittings and a wiring device support.

FIG. 2 is a cross-sectional view taken along line 2—2 of FIG. 1.

FIG. 3 is a perspective view of a converter coupling as used in the invention depicted in FIG. 1.

FIG. 4 is an exploded perspective view of a fitting which may be used for an internal or external elbow connection as illustrated in FIG. 1.

FIG. 5 is a perspective view, partly broken away, of raceways embodying the invention connected in a flat cross connection.

FIG. 6 is a perspective view, partly broken away, of a flat elbow connection.

FIG. 7 is an exploded perspective view of the skeleton and two side plates of a fitting adapted for use as a flat elbow or as a T or cross connection when one or both of the side plates are omitted.

FIG. 8 is a sectional view, partly broken away, of a supporting plate for a wiring device used in connection with the raceway, the section being a vertical section taken through FIG. 9.

FIG. 9 is a plan view of the wiring device support of FIG. 8 as shown in connection with two adjacent raceway sections which are broken away.

FIG. 10 is a perspective view of a member for shielding the join between adjoining cover sections.

Referring to the drawings, the raceway comprises a base section designated generally by numeral 20, and a cover section designated generally by numeral 30. The base is formed of any suitable material which possesses substantial rigidity when formed as herein described and also is sufficiently flexible to prevent the connection and disconnection of auxiliary parts such as elbows, converter couplings, connection covers and the like which are normally needed and used in raceway installations. The material should also be capable of being easily formed and shaped, but not too readily bent and should be non-frangible when dropped or struck, kicked or hammered. Preferable materials are ductile iron and steel.

The base is of generally rectangular shaped channel form in cross section having a bottom wall 21 and side walls 22, with the edges of its sides walls reversely bent inwardly at an angle of approximately 45° to the planes of the sides of the channel to form a jaw 24 to engage the cover, as hereinafter will more fully appear. The in-turned jaw will preferably run the full length of the raceway and may be approximately three-eighths of an inch wide in a raceway of three and one-half inches depth.

The cover section of the raceway may be formed from a strip of medium gauge sheet metal which has its opposite deges 32 folded over against the under surface of the cover for a short distance such as about 0.40 inch in a raceway of approximately four and one-half inches in width. The edges are then curved downwardly or inwardly of the raceway to provide a lip 34 with a bearing surface along the lip normal to the paw 24. When the cover and base sections are joined together, the lip is then inutrned to provide a guide surface 36 which is adapted to engage the jaw 24 when the cover is being applied to the base and to move the sides of the base section sufficiently to permit the jaws to slide over the concave surface of the lip after which the edge of the jaw 24 will engage the surface 34 longitudinally along the lip and at substantially a right angle.

Referring to FIG. 2, the jaw 24 exerts a force against the lip surface 34 with a horizontal or inward component and a vertical, transversely inward component. The horizontal component tends to pull the cover against the bend of the base lip, making a tight joint between the cover and the base. The vertical component is counteracted by an equal and opposite component of the lip.

When a corner is to be turned with the above-described raceway, a corner fitting and two identical converter coupling members may be used if the corner turned is either an internal or an external elbow, an internal elbow being as shown in the left part of FIG. 1 and an external elbow being as in the right part of FIG. 1.

Referring to FIGS. 1, 2 and 4, the fitting for either an internal or an external elbow is the same, it being necessary merely to turn the fitting upside down to convert it from one use to another.

The corner fitting comprises top and bottom plate members (designated generally by numerals 40, 40') which are identical and are preferably formed from sheet metal or the same material as the raceway. Each fitting has a substantially square flat plate portion such as 45, 45' whose edges are bent in the same direction at right angles to the plate portion forming narrow flanges such as 41, 42, 43, 44 running completely around the periphery of the plate 45. The top and bottom flanged plates are connected together by an angle member formed by bending a flat rectangular plate at a right angle at its middle forming integral side plates 47 and 48.

The sides 47, 48 of the angle member may be secured to the flanges 41, 42, 43 or 44 of the plates by screws 40s (FIG. 1) with the sides 47, 48 outside and with the screws passing through holes in the sides 47 and 48 near their edges and threaded into tapped holes such as 41h, 44h, registering therewith in the flanges.

Dimensionally the lengths of the edges of the flanged plate 40 equal the depth of the side walls 22 of the raceway base 20, measured from front to back, so that the sides 47, 48 of the angle member appear as continuations of the side walls of the raceway which they adjoin. As to the angle member, its height (measured along bent edge 49) is equal to the width of the bottom wall 21 of the raceway; and the length of its edges running along the flange-plates is equal to the length of the edges of the flange-plate with, however, the bend 49 of the angle member wrapping around the corners of the flange-plates.

To connect and secure the corner fitting to adjacent sections of the raceway, two identical converter coupling members 50 as illustrated in FIG. 3 are provided. These coupling members comprise U-shaped members preferably of sheet metal with a shallow, inwardly-offset, wide rib pressed into the transverse portion 51 of the coupling member.

Dimensionally, the outline of the coupling is approximately equal to the profile of the inner surface of the base section 20 of the raceway, as may be seen in FIG. 2 so that the coupling may be slid into the end of a raceway section with the edges of its side walls 22 sliding under the raceway jaws 24 and abutting the bend thereof. The normal slight resiliency of the coupling and raceway enables the fit therebetween to be a tight frictional connection.

To secure the coupling to the end of fitting 40, identical bracket parts 55, 56, 57 are formed on each of the three adjacent edges along one side of the coupling by bending extensions therefrom into the shape best shown in FIG. 3. Each bracket part comprises a portion such as 55' bent at right angles to whatever side 53 or 54 or the transverse portion 51 of the coupling it extends from. The end of the bracket part is further bent into hook formation 55" in an outward direction in such manner as to be able to hook over one or another of the flanges 41, 42, 43, 44 on the end fitting. (see FIG. 1.)

To secure the coupling to the end fittings, tapped holes 55h, 57h are formed in the flanges of the flange-plate and holes 42h, 43h registering therewith are formed in the side brackets 55 and 57 of the adapter for free passage of securing screws therethrough into the flange holes.

Preferably the couplings are attached and secured to the end fitting before it is applied to the end of a raceway section. Thus, the end fitting and one coupling can be connected to the end of a raceway section by the coupling being slid or telescoped into the raceway section; and then another raceway section can be connected to the end fitting by sliding the open end of such other section over the still unconnected second coupling.

The coupling can be tightened against and secured frictionally to the raceway section by screws 50s provided in tapped holes in the transverse portion of the coupling members near the sides thereof. Before connection of the raceway and adapters, such screws may be loose in their holes and retracted sufficiently so that the shanks or ends of the screws will not interfere with the sliding of the coupling and raceway together. When the screws are tightened, their ends will press against and bite into the inside surface of the raceway not only securing the coupling and fitting to the raceway firmly, but also providing a good electrical ground connection.

It will be seen that when the coupling members are connected to the end fitting, the assembly (consisting of the two couplings and the end fitting) can be used either as an inside elbow connection or as an outside elbow connection by simply turning the assembly upside down. Thus, if one assumes that the fitting and coupling assembly is rightside up in the left portion of FIG. 1, then it is upside down in the right portion of FIG. 1.

The coupling members have other uses.

In FIG. 1, the raceway is shown as if mounted on a vertical surface or wall with its back or transverse wall portion 21 flat against the vertical surface. The corners turned are vertical corners, either inside (left side of FIG. 1) or outside (right side in FIG. 1).

There are times, however, when it is desired to have the raceway turn acorner from horizontal to vertical (either upward or downward) or to make a T or a cross connection with another raceway or raceway sections, as shown in FIGS. 5 and 6.

In such cases, one section (A) is mounted horizontally as in FIG. 1 and FIGS. 5 and 6, while another abutting section (either B or C) runs vertically (up B or down C) from the end of the horizontal section as in FIG. 6. The elbow bend is then between the side walls 22 of the raceway, instead of between the front wall 31 and the back wall 21 as it was in FIG. 1.

For such purposes, a corner fitting as shown in FIGS. 5, 6 and 7 may be provided. It comprises a square plate 65 having its side edges turned up equally at right angles to the plane of the plate in the same direction forming flanges 61, 62, 63 and 64.

To the flanged plate 65, two side plates 66 and 67 are connected, each with one edge abutting a flange (such as 62 and 63) so as to be coplanar with the abutted flange.

For connecting the plates 66 and 67 to the plate 65, identical U-shaped brackets 68 and 69 are provided. Each bracket comprises a transverse part (68t and 69t) connecting at right angles with leg parts (68d, 68c and 69d, 69c) coplanar with their respective transverse parts. Each leg has an edge or flange part folded at right angles thereto along its longitudinal outside edge, 68x and 68y being folded from 68d and 68c, respectively, while 69x and 69y are folded from 69d and 69c, respectively.

The U-bracket may be secured to the inside surfaces of opposite plate flanges such as 62, 64 by screws passing through holes 68h, 69h in the transverse parts and threaded into tapped registering holes 64h and 62h in the plate flanges. The flanged plate 65 and the U-brackets form the skeleton of the fitting for making flat elbows, T-connections and cross connections.

The plates 66 and 67 are attached to the U-brackets by screws passing through holes 66h and 67h near those plate edges which are perpendicular to the back plate 65. For plate 66, screws are threaded into tapped apertures such as 69a in the bracket parts of 69c and 69d. For plate 67, the screws are threaded into tapped apertures (such as 69ya) in the parts 69y and 68y.

The holes and apertures above mentioned by which the plates are attached to the brackets are so placed that the plates 66 and 67 are interchangeable in position.

When a flat elbow connection is to be made such as shown in FIG. 6 with the raceway B going vertically upward, the elbow may be put together as just described or the plates 67 may be transposed.

When the adjoining raceway B is to go vertically downward, the position of the plate 67 will be reversed from its FIG. 7 position. In other words, it will be connected to the bracket arm parts 68x and 69x in the same fashion that it was connected to the bracket arm parts 68y and 69y for an upwardly directed elbow connection. Here again, the plate 67 may be put in the position of plate 66 and plate 66 may be put on top.

When a T-connection is to be made, the plate 67 having the jaw will be attached between the arms 68y and 69y (if the T is to consist of raceway sections A, B and C oriented as shown in FIG. 5) so that the jaw of this plate will be in alignment with the jaw of the lower side wall of the raceways that form the head of the T.

When a cross-connection is to be made, all side walls of the corner fitting will be removed.

In all cases, i.e., elbow, T or cross connection, convertible coupling members of the FIG. 3 type are used.

For either type of elbow connection (upwardly or downwardly directed elbow connections), a converter coupling is attached to the side of the fitting into which the raceway section A opens. Another coupling is likewise attached to the adjacent side of the fitting, either the up or down side, depending on whether the connecting raceway section is to proceed upwardly or downwardly. Screws may be used to attach the couplings to the parallel legs of the bracket members using appropriate holes in the legs of the brackets which are so positioned as to align with the holes 55h, 57h of the converter coupling member (see FIG. 3). The bracket portions 56 of the individual converter coupling members will overlie the individual flanged edges 61, 62, 63 or 64 as the case may be, depending upon whether a cross connection, a T or an elbow connection is to be formed.

For a T-connection, the FIG. 3 converter couplings will be attached to the three sides of the corner fitting not covered by the plates 67. In both cross and T-connections, the converter couplings are slid into the three or four raceways in the manner described in connection with FIGS. 1–4 and tightened in place by screws like 50s before the cover is applied.

One of the advantages of this invention is that wiring devices such as attachment plug receptacles, switches, pilot lights or any other conventional wiring device may be secured in place along the raceway at any desired position, without limitation, by simply cutting the cover member to provide a place for the wiring device and inserting a mounting plate of the sort now to be described; or cover sections can be applied in abutting relation to the support after it is put in the desired place.

Referring to FIGS. 1, 8 and 9, a mounting plate 80 is attached across the open front of the base section 20 between two cover sections whose ends abut against the edges of the mounting plate. The plate is preferably stamped from sheet metal in generally rectangular form with a large central rectangular opening. The ends of the plate are folded over and curved downwardly or inwardly of the raceway similarly to the cover section lips 34, to provide a lip 84 with a bearing surface along the lip normal to the jaws 24 of the raceway base, cooperating with those jaws in the same way as the cover 30 cooperates with the base 20.

The plate 80 may be of any width to accommodate a switch, a single or duplex receptacle, gangs of switches, receptacles or other devices.

Since an outward pull or force may at times be exerted on the wiring device which will be transmitted to the plate, additional means are provided to hold the plate in engagement with the base section 20, such as clamps 86 located under the plate and inside the base section of the raceway. The clamps are connected to the plate by one or more screwbolts 87. The clamps may be sheet metal stampings having a longitudinal channel formation 86c adjacent one edge while the other edge extends laterally as a flat plate-like extension or wing 86w. To provide room for the clamp 86, gaps are formed in the lips 84 of the mounting plate. The channel 86c hooks around and under the jaw 24 of the base section of the raceway upon the tightening of the screwbolts 87 which pass through holes in the plate and thread into tapped apertures in the wing portion 86w of the clamp. One or more symmetrically placed tapped holes 88 in opposite ends of the plate provide means to attach a conventional wiring device to the mounting plate.

To stiffen the plate, the longitudinal edges may be bent down to provide longitudinal flanges 89.

The mounting plate is preferably made narrower than the standard face plate of an attachment plug receptacle or switch so that when a conventional face plate is attached to a conventional receptacle mounted upon the mounting plate, the face plate will extend beyond the edges of the mounting plate and cover the joint between it and the adjacent cover sections completely.

Where two cover sections are to be joined, it is sometimes necessary to provide complete shielding, such as in laboratories where various voltages and frequencies are present and the equipment with which they are used must be kept free from outside interference.

In such cases, a cover section joint-shielding member may be used. Such member may comprise a rectangular metal plate 90 (FIG. 10) spot welded or otherwise suitably secured to the underside of a supporting strap 92. The supporting strap is in form and dimension identical in cross section to the raceway cover 30, so that the supporting strap may be snapped in place by pressure over the base section in the same way as the cover. The width of the strap may vary, but preferably it is narrow, one inch more or less having been found practical and convenient. Essentially the width of the shield plate 90 is greater than that of the strap so as to completely underlie the joints between the strap and the ends of the abutting cover sections between which it is positioned. The length of the shield plate is approximately equal to the distance between the folded under edges 32 of the cover 30 so that the shield plate together with the jaws 24 of the base section of the raceway afford adequate shielding when the shield plate is snapped in place over a raceway base between adjacent cover sections.

From the foregoing, it will be observed that the invention provides a novel raceway structure and fittings for forming either inside or outside elbow connections as well as flat elbow connections and T or cross connections. An important advantage of the invention is that mounting plates can be placed and secured at any position along the length of the raceway without any limitation whatsoever such as is imposed in prior art raceways where holes had to be drilled and tapped along the length of the raceway to support wiring devices. Moreover, the corner fittings perform dual purposes in that they can, by mere reversal or reversal of parts, be used for inside or outside elbows or, in the case of flat corner fittings, for vertically upward or vertically downward elbows; and by removing one or both side plates the same corner fittings can be used for T and cross connections.

In addition to the foregoing, the converter couplings provided for use with the corner fittings enable the fittings to be adapted for any of the above-mentioned uses by simply transposing the converter couplings into different positions or by adding or subtracting a coupling. Moreover, the couplings enable the connection of the corner fittings to the raceway with ease and permanence so much desired for simplification of installation without sacrificing ruggedness and durability.

In addition to the foregoing, the folded edges of the cover member of the raceway in cooperation with the in-turned jaws of the base section of the raceway avoid the presence of any raw or rough edges and provide complete enclosure and shielding of the wires within the raceway to prevent interference with high frequency or other sensitive equipment or circuits by emanations from or the electromagnetic field around the wires and circuitry within the raceway.

Many modifications within the scope of the invention will occur to those skilled in the art. Therefore, the invention is not limited to the precise form and dimensions of the preferred embodiment illustrated and described.

What is claimed is:

1. A raceway for a surface wiring system comprising a channel-shaped base member having side walls and a transverse connecting wall, the longitudinal edge portions of said side walls each being inturned and reversely bent to form an acute angle with its side wall, and a cover member adapted to be pressed upon and secured to said base member, said cover member having a flat plate portion overlying said base, the longitudinal sides of said cover member being reversely bent inwardly to lie flush against the under surface of said plate portion forming double-thickness edges, said edges lying upon the acute-angled longitudinal edges of the base member, and the edges of said reversely bent sides of the cover member then being bent away from said plate portion to form longitudinally extending lips in position to receive and retain the acute-angled longitudinal edge portions of the base member when said base and cover members are joined, whereby the rough longitudinal edges of said cover and base members lie within the raceway after said cover and base members are assembled.

2. A raceway as claimed in claim 1 in which the edges of the lips of the cover are inwardly directed and positioned with relation to the acute-angled edge portions of the base member so as to engage said acute-angled edge portions as said cover member is pressed on said base member in order to provide a camming action between the cover and base members enabling the edges of the lips to pass over the acute-angled edges of the base and the latter to snap into place between said inturned portions and said lips of the cover member.

3. A fitting for joining abutting sections of a raceway as claimed in claim 1 comprising square top and bottom walls having the side dimensions the same as the depth of the side walls of the raceway and spaced apart the same distance as the plate portion of the raceway cover member and the transverse wall of the raceway base member, side walls joining said top and bottom walls of the fitting at two adjacent sides, and means within said fitting securing said side walls to said top and bottom walls of the fitting, and means entirely within the raceway and fitting to secure said fitting to said abutting raceway sections.

4. A fitting as claimed in claim 3, wherein said top and bottom walls have edge flanges around their peripheries, said side walls of the fitting being secured to said flanges and being coplanar with the transverse walls of adjacent raceways when said fitting is assembled therewith.

5. A fitting as claimed in claim 3 for joining abutting raceways to form an inside corner connection or an outside corner connection, wherein said top and bottom walls comprise identical plates and said side walls of the fitting are equal, said side walls of the fitting being reversed in position relative to the walls of said raceway and fitting when used as an outside corner from the position it occupies when used as an inside corner.

6. A fitting as claimed in claim 3 wherein the last-mentioned securing means comprises identical converter coupling members each comprising a U-shaped portion slidable into the open end of a raceway base section and having portions secured to the top and bottom walls of the fitting.

7. A fitting as claimed in claim 3 wherein said top and bottom walls have edge flanges around their peripheries, and wherein said side walls of the fitting are formed from a member bent to form integral perpendicular walls, said walls being secured to said flanges and being coplanar with transverse walls of adjacent raceways when said fitting is assembled therewith.

8. A fitting for use with a raceway as claimed in claim 1 comprising a plate member, bracket members attached to said plate member and lying entirely within the fitting and providing means for supporting one or more members selected from the group comprising side plates and converter couplings to adapt the fitting for use as a T connection, a cross connection or a flat elbow, the walls of the fitting which continue the walls of the raceway being coplanar.

9. A fitting for use with a raceway as claimed in claim 1, comprising a skeleton frame including a plate member and bracket members, means securing the bracket members to the plate member so as to lie entirely inside the fitting, a group of members comprising converter coupling members and plate members, said bracket members having means to support selected members from said group to utilize said skeleton in forming an elbow, a T, or a cross connection of said raceways, the walls of the fitting which continue the walls of the raceway being coplanar.

10. A fitting for use as a flat elbow connection between raceways as claimed in claim 1, comprising a back plate member, bracket members, means securing said bracket members to said back plate member so as to lie entirely inside the fitting, side plate members, means for attaching said side plate members to said brackets at a right angle to each other, connector coupling members entirely inside the fitting, means to attach said coupling members to said bracket members.

11. The combination as claimed in claim 10 wherein said back plate member has flanged edges around its periphery and said bracket members are secured to said flanged edges, and said side plate members are coplanar with said flanged-edges in assembled position.

12. The combination as claimed in claim 11 wherein one side plate has an edge portion bent to form an acute angle with said plate in position to align with the acute-angled edge portion of the raceway when said fitting and raceway are assembled.

13. A raceway as claimed in claim 1 in combination with an elbow fitting comprising a back plate adapted to align with the transverse wall of the raceway base member, bracket members attached to said back plate and lying entirely within the fitting, side plates attached to said bracket members and forming continuations of the walls of the joined raceways, and converter coupling members attached to said brackets and having portions slidably received in the joined raceways.

14. A raceway as claimed in claim 1 in combination with a fitting for connecting adjacent raceways comprising a back plate adapted to align with the transverse walls of said raceways, bracket members attached to said back plate and lying entirely within the fitting, at least one side plate attached to said bracket members and forming a coplanar continuation of a side wall of one raceway, and converter coupling members attached to said brackets and having portions slidably received in the joined raceways.

15. The combination as claimed in claim 14 wherein the converter coupling members are identical, each comprising a U-shaped portion slidable into the open end of a raceway base section and having portions engaging said bracket members for attachment thereto.

16. A raceway as claimed in claim 1 in combination with an elbow fitting comprising identical top and bottom plates spaced apart the same distance as the plate portion of the raceway cover member and the transverse wall of the raceway base member, side walls attached to said top and bottom walls at two adjacent sides, and converter coupling members attached to said top and bottom walls lying entirely within said fitting and having portions adapted to be slid into the open end of raceway base sections.

17. The combination as claimed in claim 16 wherein said top and bottom walls have edge flanges around their peripheries, said side walls being secured to said flanges, said side walls being coplanar with the transverse walls of adjacent raceways when said fitting is assembled therewith.

18. The combination as claimed in claim 16 wherein the converter coupling members are identical, each comprising a U-shaped portion slidable into the open end of a raceway base section and having portions secured to the top and bottom walls of the fitting.

19. A raceway as claimed in claim 1 in combination with a plate adapted to support conventional wiring devices, said plate having parts of opposite edges bent in the same shape as the edges of said raceway cover member so as to be capable of being pressed into engagement across the raceway base member, and means on said plate to secure it in place at the selected position along said raceway base member.

20. The combination as claimed in claim 19 wherein said securing means comprise clamps connected to said plate and having portions formed to engage under the acute angled longitudinal edges of the said raceway base member.

21. A raceway as claimed in claim 1 in which the lips of the cover are bent to provide surfaces in substantially perpendicular abutment with the edges of the acute-angled edge portions of the base member, thereby providing locking engagement therebetween.

References Cited

UNITED STATES PATENTS

| 2,503,876 | 4/1950 | Krauss. | |
|---|---|---|---|
| 2,982,570 | 5/1961 | Lohman. | |
| 3,018,535 | 1/1962 | Griffin | 220—60 XR |
| 2,762,398 | 9/1956 | Adam | 138—163 |
| 3,023,032 | 2/1962 | Johnston et al. | 285—424 X |

FOREIGN PATENTS 663,965  8/1938  Germany.

OTHER REFERENCES

Wiremold Catalog & Wiring Guide #18, the Wiremold Company, pp. 64–65, 78–79, 84–85, 92–93, Hartford, Conn. Received in the Patent Office April 1957.

LAVERNE D. GEIGER, *Primary Examiner.*

B. KILE, *Assistant Examiner.*